(12) United States Patent
Zheng

(10) Patent No.: US 10,558,706 B2
(45) Date of Patent: Feb. 11, 2020

(54) METHOD AND SYSTEM FOR DETERMINING USER INTERESTS BASED ON A CORRESPONDENCE GRAPH

(71) Applicant: Yahoo Holdings, Inc., Sunnyvale, CA (US)

(72) Inventor: Hao Zheng, Saratoga, CA (US)

(73) Assignee: Oath Inc., New York, NY (US)

(*) Notice: Subject to any disclaimer, the term of this patent is extended or adjusted under 35 U.S.C. 154(b) by 679 days.

(21) Appl. No.: 14/435,789

(22) PCT Filed: Dec. 17, 2014

(86) PCT No.: PCT/CN2014/094119
§ 371 (c)(1),
(2) Date: Apr. 15, 2015

(87) PCT Pub. No.: WO2016/095133
PCT Pub. Date: Jun. 23, 2016

(65) Prior Publication Data
US 2016/0342705 A1 Nov. 24, 2016

(51) Int. Cl.
*G06F 16/00* (2019.01)
*G06F 16/901* (2019.01)

(52) U.S. Cl.
CPC .................. *G06F 16/9024* (2019.01)

(58) Field of Classification Search
CPC ......... G06F 17/30958; G06F 17/30961; G06F 16/9024; G06F 16/958; G06F 16/906; G06F 16/9305
See application file for complete search history.

(56) References Cited

U.S. PATENT DOCUMENTS

| 7,809,740 B2 | 10/2010 | Chung et al. |
| 9,141,709 B1 * | 9/2015 | Keslin ................ G06F 16/9535 |
| 9,373,146 B2 * | 6/2016 | Yan .................... G06Q 50/01 |

(Continued)

FOREIGN PATENT DOCUMENTS

| CN | 103514204 A | 1/2014 |
| EP | 2587826 A1 | 5/2013 |

OTHER PUBLICATIONS

International Search Report and Written Opinion dated Jul. 28, 2015 in International Application PCT/CN2014/094119.

(Continued)

*Primary Examiner* — Leslie Wong
(74) *Attorney, Agent, or Firm* — Pillsbury Winthrop Shaw Pittman LLP

(57) ABSTRACT

The present teaching relates to determining user interests based on a correspondence graph. In one example, correspondences among a plurality of users are obtained. Connections among at least some of the plurality of users are identified based on the correspondences. A graph is constructed based on the identified connections. Each of the identified connections has a strength determined based on correspondences associated with the identified connection. One or more seed users are selected from the plurality of users. Each of the one or more seed users has at least one known interest. An interest is determined for each of the at least some of the plurality of users based on the graph and the known interests of the one or more seed users.

17 Claims, 17 Drawing Sheets

(56) References Cited

U.S. PATENT DOCUMENTS

| | | | |
|---|---|---|---|
| 9,552,399 B1* | 1/2017 | Browning | G06F 17/30554 |
| 2007/0239535 A1 | 10/2007 | Koran et al. | |
| 2011/0196855 A1* | 8/2011 | Wable | G06F 17/30631 |
| | | | 707/711 |
| 2012/0265816 A1* | 10/2012 | Picault | G06Q 30/02 |
| | | | 709/204 |
| 2014/0089400 A1* | 3/2014 | Yan | G06Q 50/01 |
| | | | 709/204 |
| 2014/0143405 A1* | 5/2014 | Pavlidis | G06Q 30/0202 |
| | | | 709/224 |
| 2014/0215063 A1* | 7/2014 | Krishnamurthy | G06Q 10/10 |
| | | | 709/224 |
| 2014/0280121 A1* | 9/2014 | Sharp | G06F 17/3053 |
| | | | 707/732 |
| 2014/0330653 A1* | 11/2014 | Qiu | G06Q 30/0269 |
| | | | 705/14.66 |
| 2014/0365504 A1* | 12/2014 | Franceschini | G06F 17/30958 |
| | | | 707/748 |
| 2015/0278691 A1* | 10/2015 | Xia | G06N 5/04 |
| | | | 706/11 |
| 2016/0267549 A1* | 9/2016 | Yan | G06Q 50/01 |

OTHER PUBLICATIONS

International Preliminary Report on Patentability dated Jun. 29, 2017 in International Application PCT/CN2014/094119.

* cited by examiner

METHOD AND SYSTEM FOR DETERMINING USER INTERESTS BASED ON A CORRESPONDENCE GRAPH

CROSS REFERENCE TO RELATED APPLICATION

This application is a national stage application, filed under 35 U.S.C. § 371, of International Application No. PCT/CN2014/094119, filed on Dec. 17, 2014, entitled "METHOD AND SYSTEM FOR DETERMINING USER INTERESTS BASED ON A CORRESPONDENCE GRAPH", which is hereby incorporated by reference in its entirety.

BACKGROUND

1. Technical Field

The present teaching relates to methods, systems, and programming for user profiling. More specifically, the present teaching is directed to methods, systems, and programming for inferring user interests and utilization thereof 2. Discussion of Technical Background User profiles on the web and mobile platform are subject to data quality and coverage issue. They tend to become obsolete as most users have little incentive to update their profile or declare their interests. This is particularly the case as user's content consumption profile evolves quickly over time.

The effectiveness of the user profiling can be measured by calculating the profile coverage generated. It can also be measured by the speed at which a set of new behavior data collected for a small number of users can affect the profile quality of other users they are associated with. Ultimately, the effectiveness should be evaluated by measuring improvement of the overall product metrics, such as click-through-rate, conversion, dwell-time, etc.

One solution for user profiling is user interest mining, which typically models users by a set of profile features and behavioral features. It defines a set of user actions as model targets, such as user clicking on an article of a particular topic, and tries to apply the model learned from a set of positive and negative samples to the unknown population. However, the known user interest mining techniques are limited in the sense that they do not take users relationship into consideration, in particular, implicit links between users which can be derived from user interaction data.

Therefore, there is a need to provide an improved solution for inferring user interest to solve the above-mentioned problems.

SUMMARY

The present teaching relates to methods, systems, and programming for user profiling. More specifically, the present teaching is directed to methods, systems, and programming for inferring user interests and utilization thereof.

In one example, a method, implemented on at least one computing device each having at least one processor, storage, and a communication platform connected to a network for determining user interest is disclosed. Correspondences among a plurality of users are obtained. Connections among at least some of the plurality of users are identified based on the correspondences. A graph is constructed based on the identified connections. Each of the identified connections has a strength determined based on correspondences associated with the identified connection. One or more seed users are selected from the plurality of users. Each of the one or more seed users has at least one known interest. An interest is determined for each of the at least some of the plurality of users based on the graph and the known interests of the one or more seed users.

In a different example, a system for determining user interest is disclosed. The system includes a user correspondence analyzing module, a user correspondence graph building module, a seed user determining module, and a user interest inference module. The user correspondence analyzing module is configured to obtain correspondences among a plurality of users and identify connections between at least some of the plurality of users based on the correspondences. The user correspondence graph building module is configured to construct a graph based on the identified connections. Each of the identified connections has a strength determined based on correspondences associated with the identified connection. The seed user determining module is configured to select one or more seed users from the plurality of users. Each of the one or more seed users has at least one known interest. The user interest inference module is configured to determine an interest for each of the at least some of the plurality of users based on the graph and the known interests of the one or more seed users.

Other concepts relate to software for implementing the present teaching on determining user interest. A software product, in accord with this concept, includes at least one non-transitory machine-readable medium and information carried by the medium. The information carried by the medium may be executable program code data, parameters in association with the executable program code, and/or information related to a user, a request, content, or information related to a social group, etc.

In one example, a non-transitory machine readable medium having information recorded thereon for determining user interest is disclosed. The recorded information, when read by the machine, causes the machine to perform a series of processes. Correspondences among a plurality of users are obtained. Connections among at least some of the plurality of users are identified based on the correspondences. A graph is constructed based on the identified connections. Each of the identified connections has a strength determined based on correspondences associated with the identified connection. One or more seed users are selected from the plurality of users. Each of the one or more seed users has at least one known interest. An interest is determined for each of the at least some of the plurality of users based on the graph and the known interests of the one or more seed users.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of user interest inference based on a correspondence graph, which can be realized as a specialized and networked system by utilizing one or more computing devices (e.g., mobile phone, personal computer, etc.) and network communications (wired or wireless). The method and system as disclosed herein model users as nodes in a connected directed graph and rely on users' relationship to predict behavioral patterns. For example, the method and system in the present teaching can derive a social graph from users' daily digital communications, for example, email, instant messaging, short message service (SMS), and multimedia message service (MMS), which constitute implicit links between the users.

In some embodiments of the present teaching, the implicit links are associated with derived strengths of the links and contain contextual information from the content covered in the correspondences. For example, each link may contain a set of weights for the set of content properties. In some embodiments of the present teaching, the link analysis is semantic dependent, i.e. each node carries a set of interest rank values for the set of interest properties, not a single rank value.

Moreover, the model proposed in the present teaching is scalable and dynamic as the correspondence graph can be dynamically updated and augmented. Any update of the property at each node (user) can lead to more accurate inference in the clique around the node in the correspondence graph.

Figure 1:
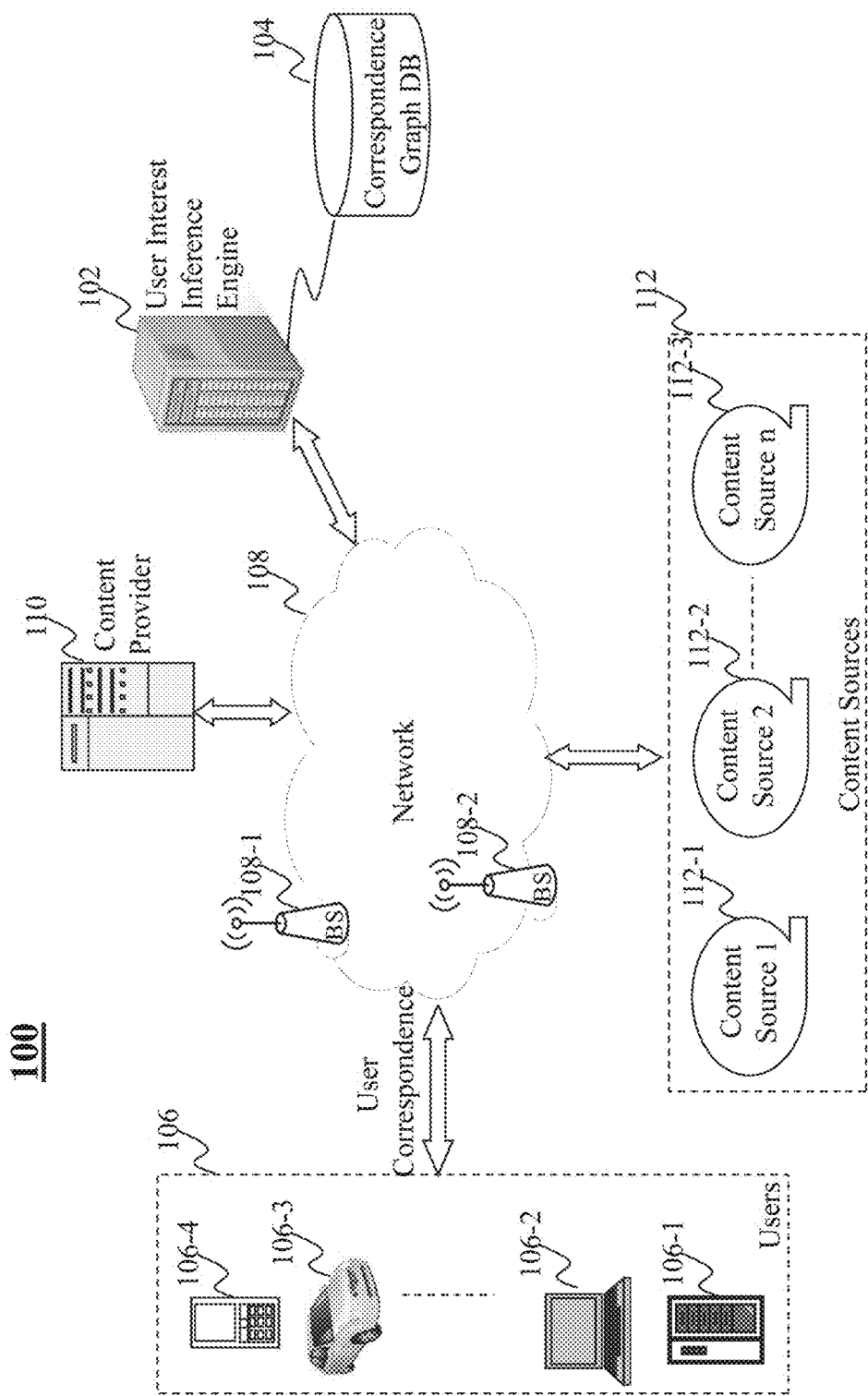
FIGS. 1-2 illustrate exemplary system configurations in which an user interest inference engine can be deployed, according to various embodiments of the present teaching.
Figure 2:
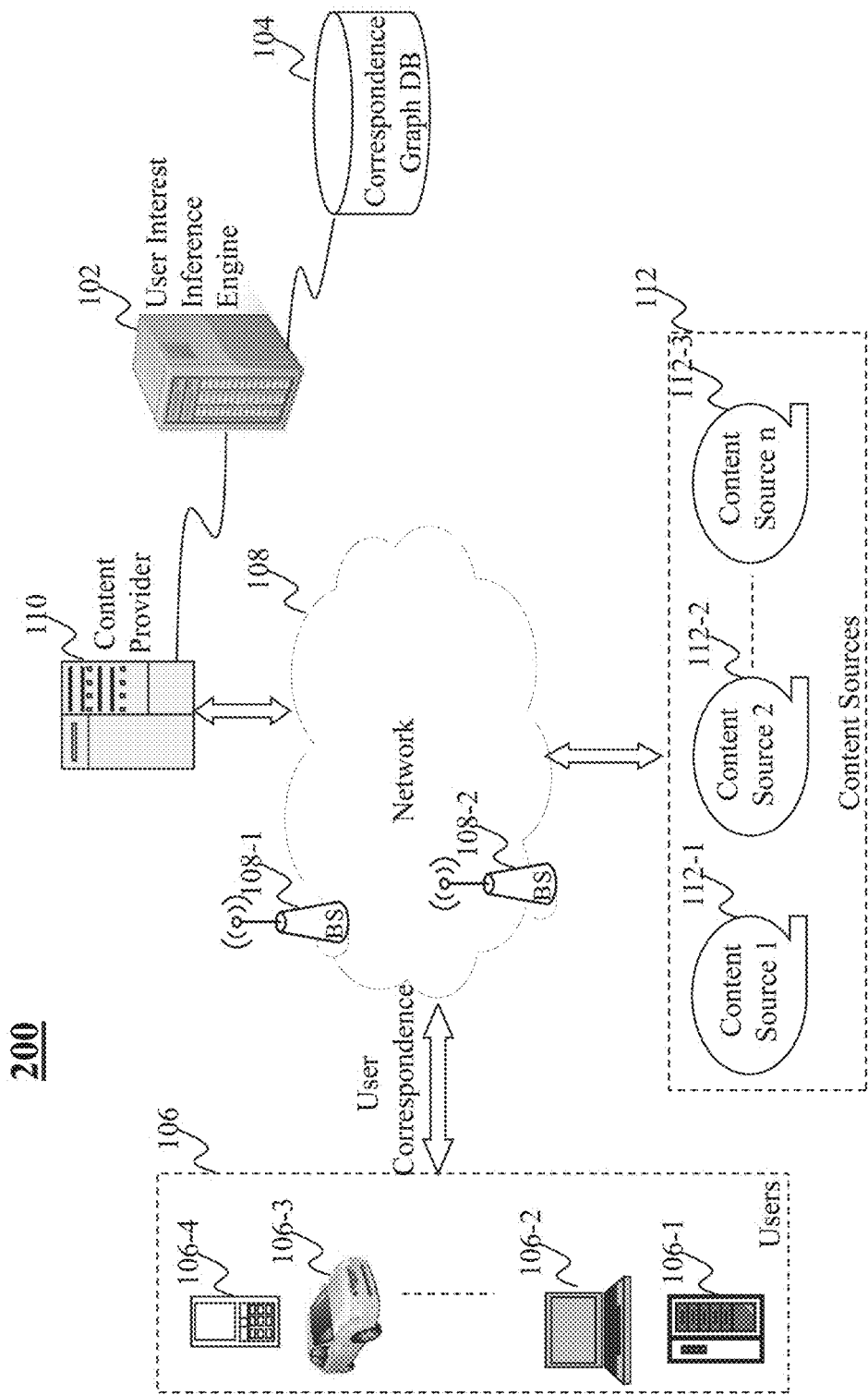

FIGS. 1-2 illustrate exemplary system configurations in which a user interest inference engine can be deployed, according to various embodiments of the present teaching. In FIG. 1, the exemplary system 100 includes the user interest inference engine 102, a correspondence graph database 104, users 106, a network 108, one or more publisher portals or content providers 110, and content sources 112 including content source 1 112-1, content source 2 112-2, . . . , content source n 112-3.

The network 108 may be a single network or a combination of different networks. For example, a network may be a local area network (LAN), a wide area network (WAN), a public network, a private network, a proprietary network, a Public Switched Telephone Network (PSTN), the Internet, a wireless network, a cellular network, a virtual network, or any combination thereof. A network may also include various network access points, e.g., wired or wireless access points such as base stations or Internet exchange points 108-1, . . . , 108-2, through which a data source may connect to the network 108 in order to transmit information via the network 108, and a network node may connect to the network 108 in order to receive information.

The content provider 110 may be a publisher, a search engine, a content portal, or any other sources from which content can be obtained. The content provider 110 may correspond to an entity, whether an individual, a firm, or an organization, publishing or supplying content, including a blogger, television station, a newspaper issuer, a web page host, a content portal, an online service provider, or a game server. The content provider 110 may receive information related to user profiles, including declared and inferred user interests, from various sources for applications such as personalized content recommendation or individualized search. In this example, at least part of the inferred user interests can be provided by the user interest inference engine 102. The user interest inference engine 102 characters a user, for example, by interfering the user's interests based on a correspondence graph stored in the correspondence graph database 104. The correspondence graph is constructed based on the correspondences among users 106. Although the correspondence graph database 104 is shown as an individual component apart from the user interest inference engine 102, it is understood that the correspondence graph database 104 may be part o the user interest inference engine 102 in some embodiments.

The users 106 may be of different types such as users connected to the network 108 via desktop connections (106-1), users connecting to the network 108 via wireless connections such as through a laptop (106-2), a handheld device (106-4), or a built-in device in a mobile vehicle such as a motor vehicle (106-3). The users 106 may be connected to the network 108 and able to communicate with each other by various types of correspondences. In this example, the correspondences may be any types of digital communication, including but not limited to, email, instant message, short message service (SMS) based communication, and multimedia message service (MMS) based communication. It is understood that non-digital communication such as mails or telephone calls may also be considered part of the user correspondences in the present teaching. In some embodiments, the user correspondences may also include indirect communication among users. For example, different users may make comments in the same thread of an online discussion forum or chat with each other in an online chat room or an online game. The records of any indirect online communication among different users may also be considered as part of the user correspondences in the present teaching.

In some embodiments, as will be described in further detail below, the user interest inference engine 102 collects and processes correspondences among the users 106 to obtain useful information such as senders, recipients, timestamps and directions of the correspondences, topics of the correspondences, etc. Based on the obtained information, the user interest inference engine 102 constructs a correspondence graph for the set of users 106, in which each node of the graphic corresponds to one of the users 106. The correspondence graph may be stored in the correspondence graph database 104 and dynamically updated and augmented based on any newly received user correspondences.

In some embodiments, as will be described in further detail below, to infer interests of the users 106, the user interest inference engine 102 may retrieve the most-recent correspondence graph of the users of interest from the correspondence graph database 104 and identify a set of seed users whose interests are considered known and accurate, for example, based on declared interests or explicit user actions. For each seed user (a node in the correspondence graph), the user interest inference engine 102 propagates his/her known interest(s) through the links in the correspondence graph to the neighbors. At each node of the correspondence graph, the corresponding user's interests are determined by summing up the contributions from all of its neighbors with the assumption that users who communicate with each other likely share the same interests.

The content sources 112 include multiple content sources 112-1, 112-2, . . . , 112-3, such as vertical content sources (domains). A content source 112 may correspond to a website hosted by an entity, whether an individual, a business, or an organization such as USPTO.gov, a content provider such as cnn.com and Yahoo.com, a social network website such as Facebook.com, or a content feed source such as tweeter or blogs. In this embodiment, some of the user correspondences may be collected, organized, and stored in the content sources 112. For example, emails may be stored on email servers of the email account providers. The content provider 110 or the user interest inference engine 102 may access information from any of the content sources 112-1, 112-2, . . . , 112-3.

FIG. 1 shows a system configuration 100 in which the user interest inference engine 102 serves as an independent service provider in relation to the content provider 110. In this configuration, the user interest inference engine 102 can be connected to a plurality of content providers and facilitate user interest inference as a service to any content provider. FIG. 2 presents a slightly different system configuration 200 in which the user interest inference engine 102 is coupled to the content provider 110 as a backend sub-system. In this configuration, the user interest inference engine 102 as shown is used only by the content provider 110 in operation.

Figure 3:
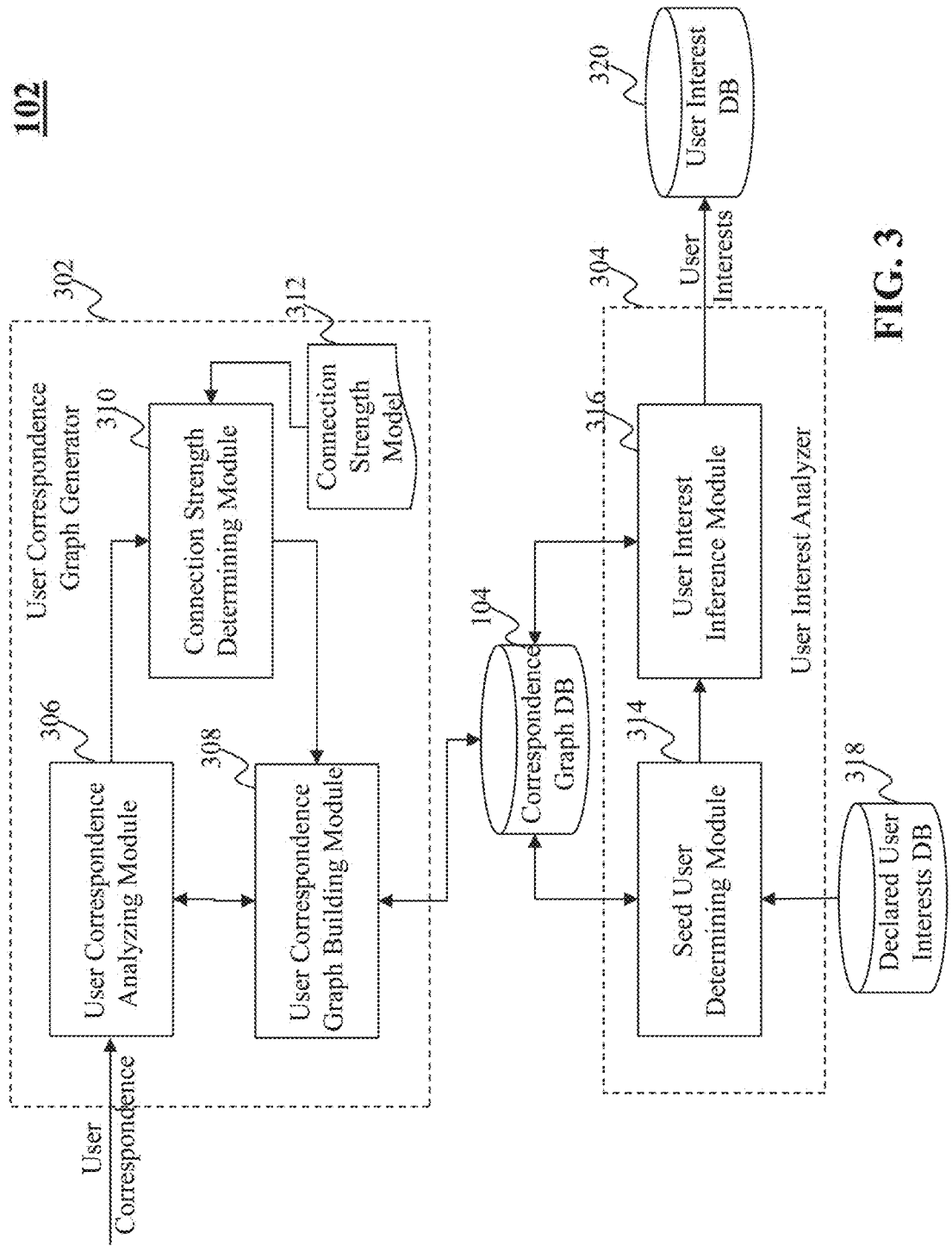
FIG. 3 is a high level exemplary system diagram of a user interest inference engine, according to an embodiment of the present teaching.

FIG. 3 is a high level exemplary system diagram of a user interest inference engine, according to an embodiment of the present teaching. The user interest inference engine 102 in this embodiment includes a user correspondence graph generator 302, a user interest analyzer 304, and the correspondence graph database 104. The user correspondence graph generator 302 is responsible for building and updating a correspondence graph for a set of users based on the correspondences among the set of users. In other words, the user correspondence graph generator 302 identifies implicit links among users by mining useful information from the users' communication. For different sets of users, their respective correspondence graphs are stored in the correspondence graph database 104. A correspondences graph may be stored as a sparse matrix or any other suitable data structure as known in the art. To infer interests of a particular set of users, the user interest analyzer 304 is responsible for identifying seed user(s) from the set of users and determining interests of other users based on the known interests of the seed user(s) and the set of user's correspondence graph.

The user correspondence graph generator 302 in this embodiment includes a user correspondence analyzing module 306, a user correspondence graph building module 308, and a connection strength determining module 310. The user correspondence analyzing module 306 is configured to obtain correspondences among a set of users and identify connections between at least some users in the user set based on the correspondences. Depending on the types of user correspondences, the user correspondence analyzing module 306 may be implemented on the server side, for example, for emails, or on the client side for emails, instant messages, SMSs, MMSs, etc. For any information obtained at the client side, it may be uploaded to the server of the user interest inference engine 102. The user correspondence graph building module 308 is configured to construct a correspondence graph based on the identified connections for the set of users. Each node of the correspondence graph corresponds to one of the users who are connected with at least another user in the user set based on the user correspondences. The connection strength determining module 310 is configured to determine a strength for each connection (the link between two nodes in the correspondence graph) based on the correspondences associated with the connection. The strength indicates the degree of association between the two users. The strength may be determined using a connection strength model 312. One exemplary connection strength model 312 may be based on parameters extracted from the metadata of the correspondences, such as frequency and recency of the communication between the two users. The strength may also be over one or more interests shared by the two users, e.g., topics identified from the content of the correspondences between the two users.

The user interest analyzer 304 in this embodiment includes a seed user determining module 314 and a user interest inference module 316. The seed user determining module 314 is configured to select one or more seed users from the set of users, each of who has at least one known interest. That is, a seed user is one whose interests are considered accurate, either because they are declared interests or implied interests above a certain confidence level (threshold). In this example, a declared user interest database 318 may store interests that have been declared by users, e.g., by responding to an injury or filling out a personal profile page/form. The implied user interests may be determined and evaluated based on information from the correspondence graph database 104 and used as another basis by the seed user determining module 314 for choosing seed users. The details will be described later. Each declared user interest is considered known and accurate. The user interest interference module 316 is configured to determine interest(s) for each of the users (nodes in the correspondence graph) based on the correspondence graph retrieved from the correspondence graph database 104 and the known interests of the seed users provided by the seed user determining module 314. The user interests determined by the user interest inference module 316 are stored in the user interest database 320 for future use.

Figure 4:
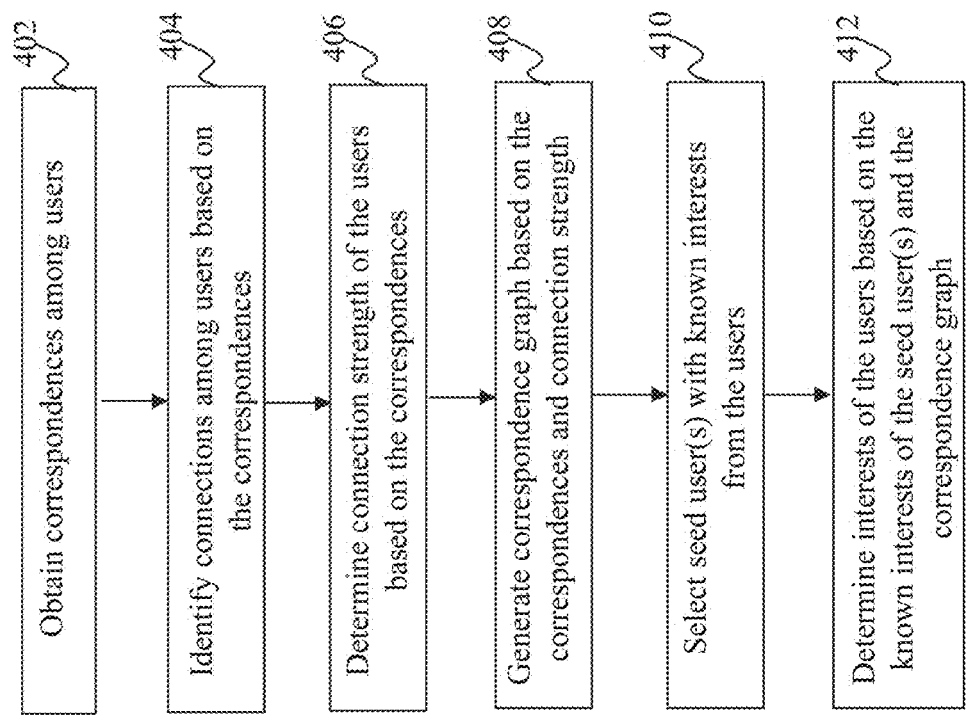
FIG. 4 is a flowchart of an exemplary process for a user interest inference engine, according to an embodiment of the present teaching.

FIG. 4 is a flowchart of an exemplary process for a user interest inference engine, according to an embodiment of the present teaching. In operation, at 402, correspondences among a set of users are obtained. The correspondences may be fetched at the server side or collected at the client side and uploaded to the server side. The correspondences include, for example, email, instant message, SMS based communication, and MMS based communication. At 404, connections among at least some of the users in the user set are identified based on the obtained correspondences. A connection may be unidirectional or bidirectional between two users based on the direction of their communication, e.g., whether the recipient of a correspondence replies to the sender. At 406, connection strengths of the users are determined based on the correspondences. The connection strength may be determined by parameters extracted from the metadata of the correspondences, such as frequency, recency, and communication direction. In some embodiments, the connection strength may be associated with one or more topics determined based on the correspondences associated with the connection. The topics may be determined based on the content of the correspondences. For example, the connection strength may be represented by a set of static weights, a model, or a vector representing the strength over interests/topics. In some embodiment, the connection strength may be adjusted for time decay. At 408, a correspondence graph is generated based on the correspondences and the connection strengths. Each node of the correspondence graph corresponds to one user in the user set, and each link corresponds to a connection between two users in the user set. Each link may be associated with a set of weights based on the connection strengths.

At 410, one or more seed users are selected from the user set, each of who has one or more known interests. The seed users may be selected based on their declared user interests and/or user interests derived from the correspondences. For example, topics of the content in the correspondences between users may be derived as implied interests of the users. If an implied interest is above a confidence level, then the implied interest may be considered as a known interest. At 412, interests of the users in the correspondence graph are determined based on the correspondence graph and the known interests of the seed users. The known interest of each seed user may be propagated to its neighbors in the correspondence graph. For example, for each seed user, its interest set is propagated to its direct neighbors, with attenuation or amplification proportional to the weight set of the link. For example, the levels of the known interest signals from the seed users may be amplified or attenuated by the weights associated with the links (connections strengths) over the network in the correspondence graph. The levels of the known interests at each neighbor of the seed user are adjusted based on the connection strength between the neighbor and the seed user. For example, at each node, its interest set is calculated by summing up the contributions from all of its neighbors. This process may iterate until reaching convergence.

Figure 5:
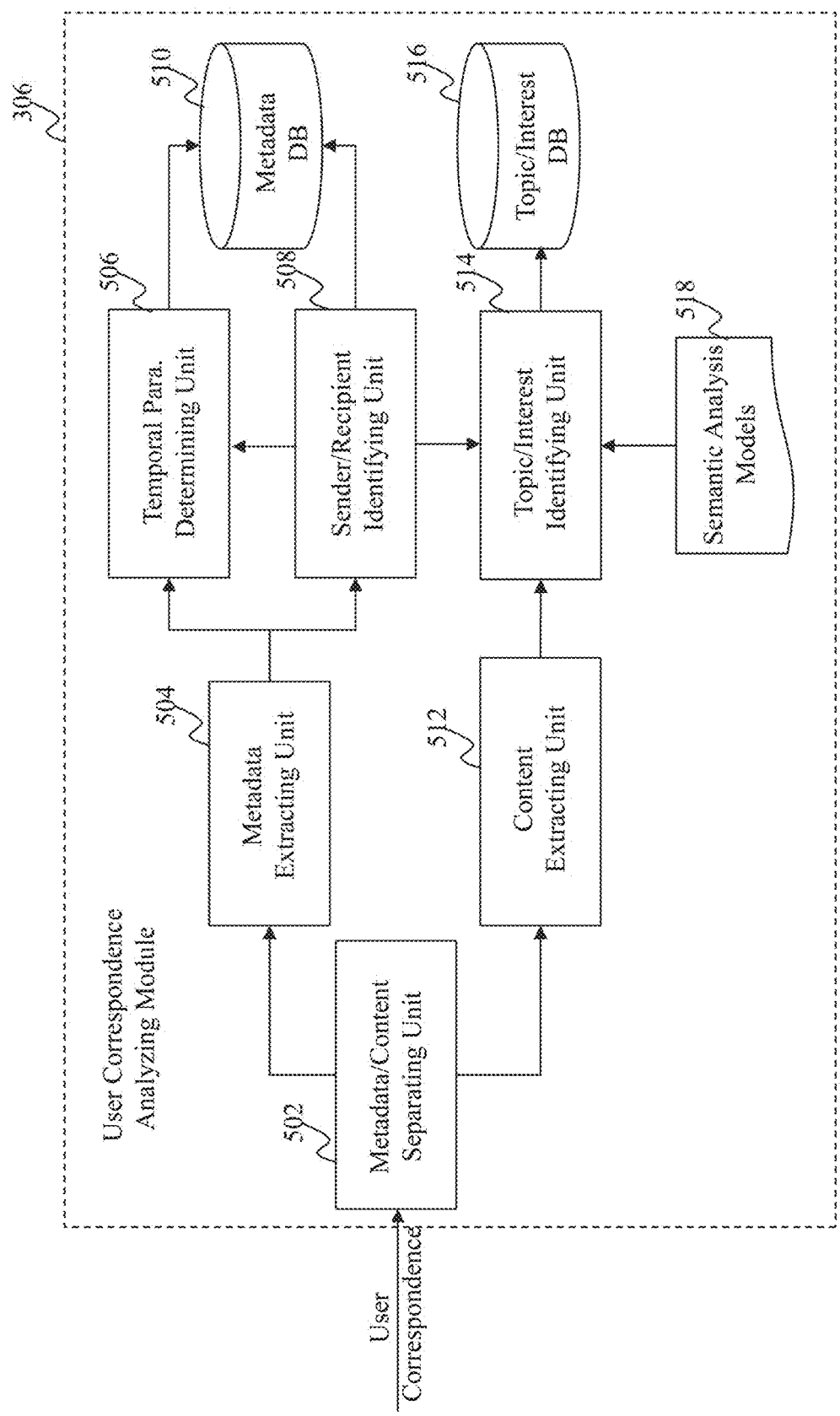
FIG. 5 is an exemplary system diagram of a user correspondence analyzing module, according to an embodiment of the present teaching.

FIG. 5 is an exemplary system diagram of the user correspondence analyzing module in FIG. 3, according to an embodiment of the present teaching. The user correspondence analyzing module 306 in this embodiment includes a metadata/content separating unit 502, a metadata extracting unit 504, a temporal parameter determining unit 506, a sender/recipient identifying unit 508, and a metadata database 510. The metadata/content separating unit 502 separates the metadata of a correspondence from its content. For example, message headers containing metadata may be separated from message bodies with content. The metadata extracting unit 504 extracts metadata of interest, such as time stamps of a correspondence (e.g., sending and receiving times) and sender/recipient information. The temporal parameter determining unit 506 receives the time stamps and determines temporal parameters based on the time stamps, including, for example, the frequency and recency of the communication between two users. The sender/recipient identifying unit 508, based on the sender/recipient information, identifies connections between users and the directions of communication. All the results analyzed based on metadata, e.g., frequency, recency, and direction of communication are stored in the metadata database 510. As described above, some or all of the metadata/content separating unit 502, metadata extracting unit 504, temporal parameter determining unit 506, sender/recipient identifying unit 508, and metadata database 510 may be implemented on the server side, or implemented on the client side (local devices) while their outputs can be uploaded to the server.

In this embodiment, the user correspondence analyzing module 306 also includes a content extracting unit 512, a topic/interest identifying unit 514, and a topic/interest database 516. In addition to information obtained from metadata, contextual information from the content covered in the correspondences may be obtained as well. The content extracting unit 512 extracts the content covered in the correspondences, e.g., from their bodies. The topic/interest identifying unit 514 identifies the topics from each piece of content using semantic analysis models 518 or any other known approach. The topics from different pieces of content in the correspondences between a pair of users (e.g., identified by the sender/recipient identifying unit 508) may be aggregated to derive a set of implied interests that are shared by the pair of users. For example, if two users frequently and recently exchange emails and messages related to college basketball matches and occasionally exchange messages about movies, then an implied user interest set (e.g., "basketball: strong; move: fair") may be identified for the correspondences between the two users. The identified user interest sets for each connection are stored in the topic/interest database 516 for future use.

Figure 6:
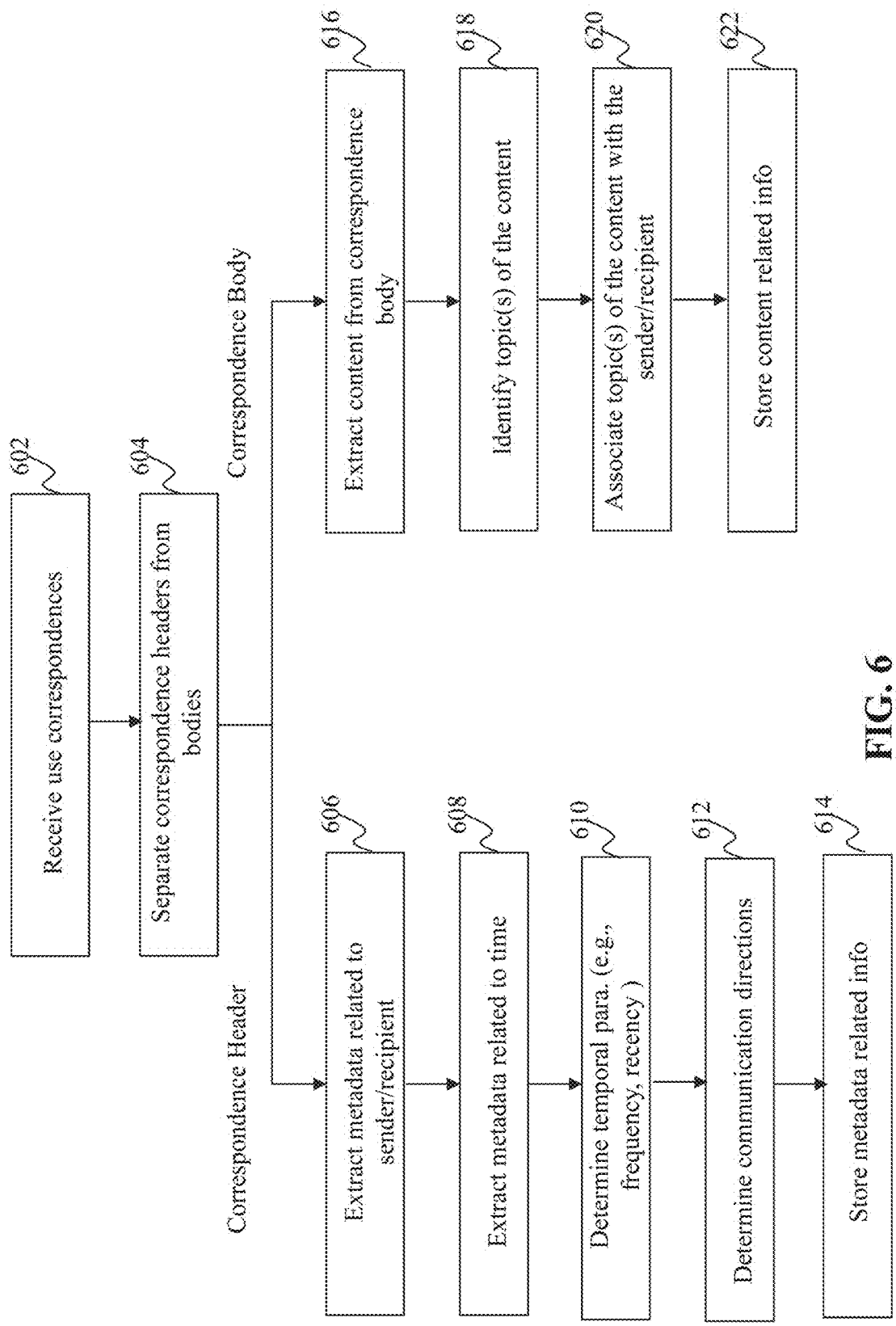
FIG. 6 is a flowchart of an exemplary process for a user correspondence analyzing module, according to an embodiment of the present teaching.

FIG. 6 is a flowchart of an exemplary process for a user correspondence analyzing module, according to an embodiment of the present teaching. In operation, at 602, correspondences among users are received. At 604, correspondence headers and bodies are separated. For the correspondence headers, at 606, metadata related to sender/recipient is extracted. At 608, time-related metadata is retrieved as well. At 610, temporal parameters, such as frequency and recency, are determined based on the time-related metadata. At 612, communication direction between the users is determined, e.g., either unidirectional or bidirectional. At 614, all the metadata-related information is stored. For the correspondence body, at 616, content is extracted from the correspondence bodies. At 618, topics of the content are identified, for example, by semantic analysis. At 620, topics of the content are associated with each pair of users (e.g., the sender and each of the recipients of a correspondence) as their shared implied interests. At 622, the content related information, e.g., topics/interests, is stored as well.

Figure 7:
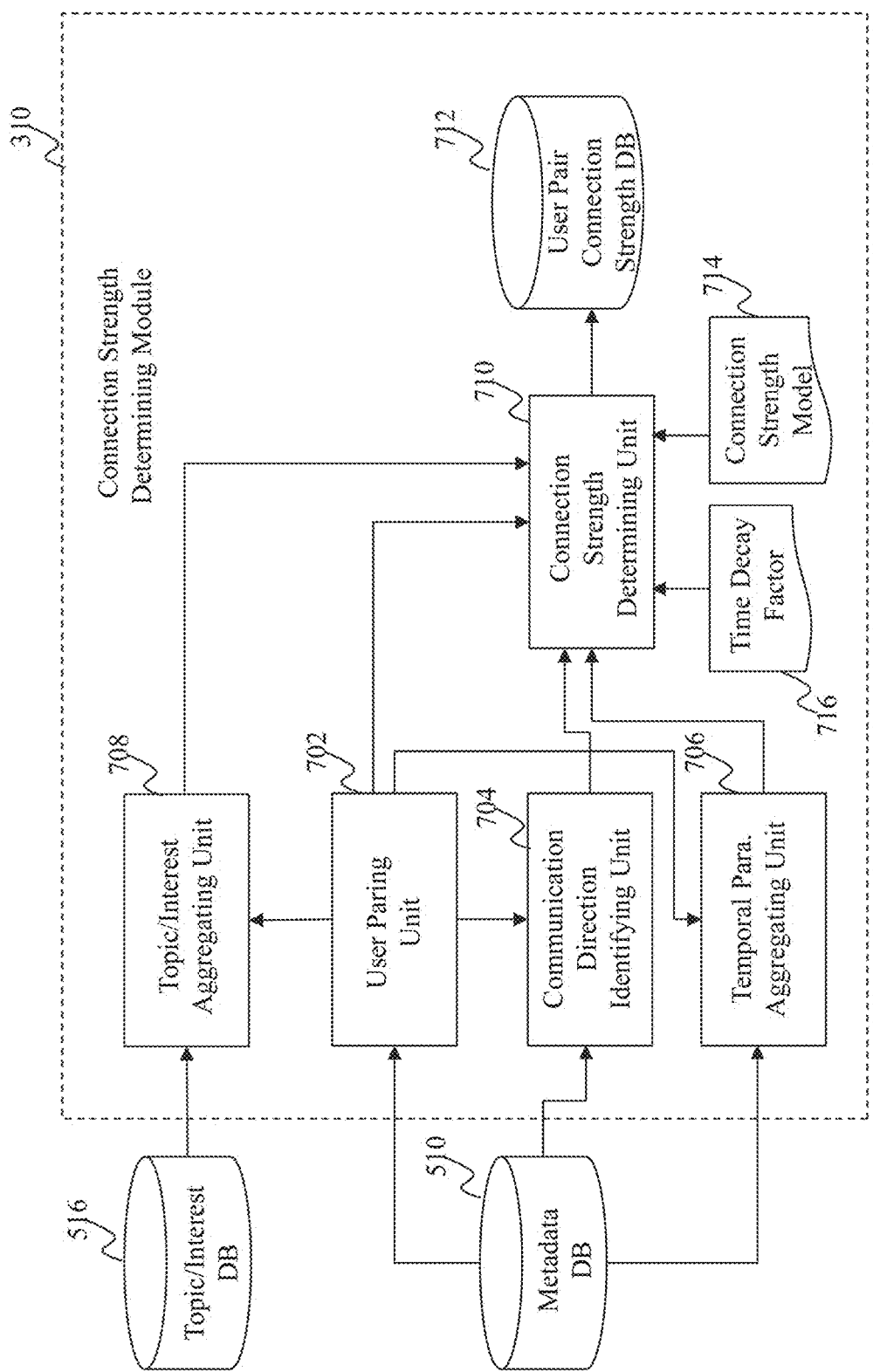
FIG. 7 is an exemplary system diagram of a connection strength determining module, according to an embodiment of the present teaching.

FIG. 7 is an exemplary system diagram of the connection strength determining module in FIG. 3, according to an embodiment of the present teaching. The connection strength determining module 310 in this embodiment includes a user paring unit 702, a communication direction identifying unit 704, a temporal parameter aggregating unit 706, a topic/interest aggregating unit 708, a connection strength determining unit 710, and a user pair connection strength database 712. The user pairing unit 702 determines a pair of user connected by a link in the correspondence graph, i.e., a connection between the users. The user pair may be determined based on information stored in the metadata database 510, such as the sender/recipient information. The direction of communication for each pair of user is determined by the communication direction identifying unit 704. Similarly, the determination may be made based on the sender/recipient information stored in the metadata database 510. The temporal parameters, such as frequency and recency, are aggregated by the temporal parameter aggregating unit 706 based on the temporal parameters retrieved from the metadata database 510. For each pair of users, there is only one connection therebetween, i.e., one link in the correspondence graph. Thus, temporal parameters for the same pair of users obtained from different correspondences may be consolidated by the temporal parameter aggregating unit 706 in order to obtain aggregated temporal parameters, e.g., aggregated frequency and recency, for the specific user pair and connection thereof. Similarly, the topic/interest aggregating unit 708 consolidates the implied interests for the user pair derived from different correspondences (stored in the topic/interest database 516) in order to generate an aggregated implied user interest set for the specific user pair and connection thereof.

The connection strength determining unit 710 in this embodiment receives the user pairs/connections information, communication direction information, aggregated temporal parameters for each user pair/connection, and aggregated implied interest sets for each user pair/connection. Based on all the received information and a connection strength model 714, the connection strength determining unit 710 determines connection strengths for each user pair/connection. In one example, a set of static weights is calculated for each connection taking into consideration of the impacts of each received input. The values of the weights indicate the degree of association between the two users. For example, the higher the frequency is, the larger the weight is; more recent connection has a higher weight; bidirectional connection has a higher weight than unidirectional connection. Each value of the set of weights may correspond to one implied interest in the interest set. For example, two users sharing a strong interest in "basketball" have a relative high value of weight in terms of "basketball," but relative low or zero values of weight in terms of other interests. In another example, instead of a set of static weights, the connection strength may be a model or a vector representing the degree of association between the pair of users over the implied user interest. It is understood that for a correspondence with multiple recipients, the weights affected by such correspondence may be normalized for each recipient. In this embodiment, the set of weights, regardless of whether they are static values, models, or vectors, may be in a linear fashion with a time decay factor 716.

Figure 8:
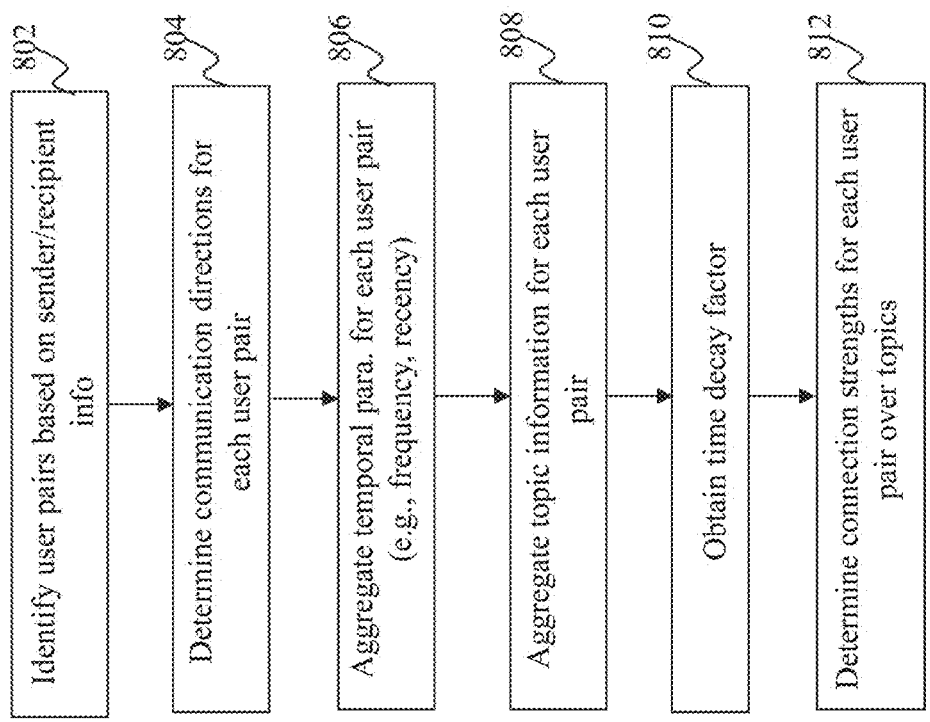
FIG. 8 is a flowchart of an exemplary process for a connection strength determining module, according to an embodiment of the present teaching.

FIG. 8 is a flowchart of an exemplary process for a connection strength determining module, according to an embodiment of the present teaching. In operation, at 802, user pairs are identified based on the sender/recipient information. At 804, commination directions for each user pair are determined, either unidirectional or bidirectional. At 806, temporal parameters are aggregated for each user pair, e.g., frequency and recency. At 808, topic/interest information for each user pair is aggregated as well. At 810, a time decay factor is obtained, which is to be used for adjusting the connection strength over time. At 812, connection strengths for each user pair over topics/user interests are determined based on, for example, communication direction, aggregated temporal parameters, aggregated topic/interest information, and time decay factor. The connection strengths may be represented as a set of static weights, weights determined by a model, or vectors over interests.

Figure 9:
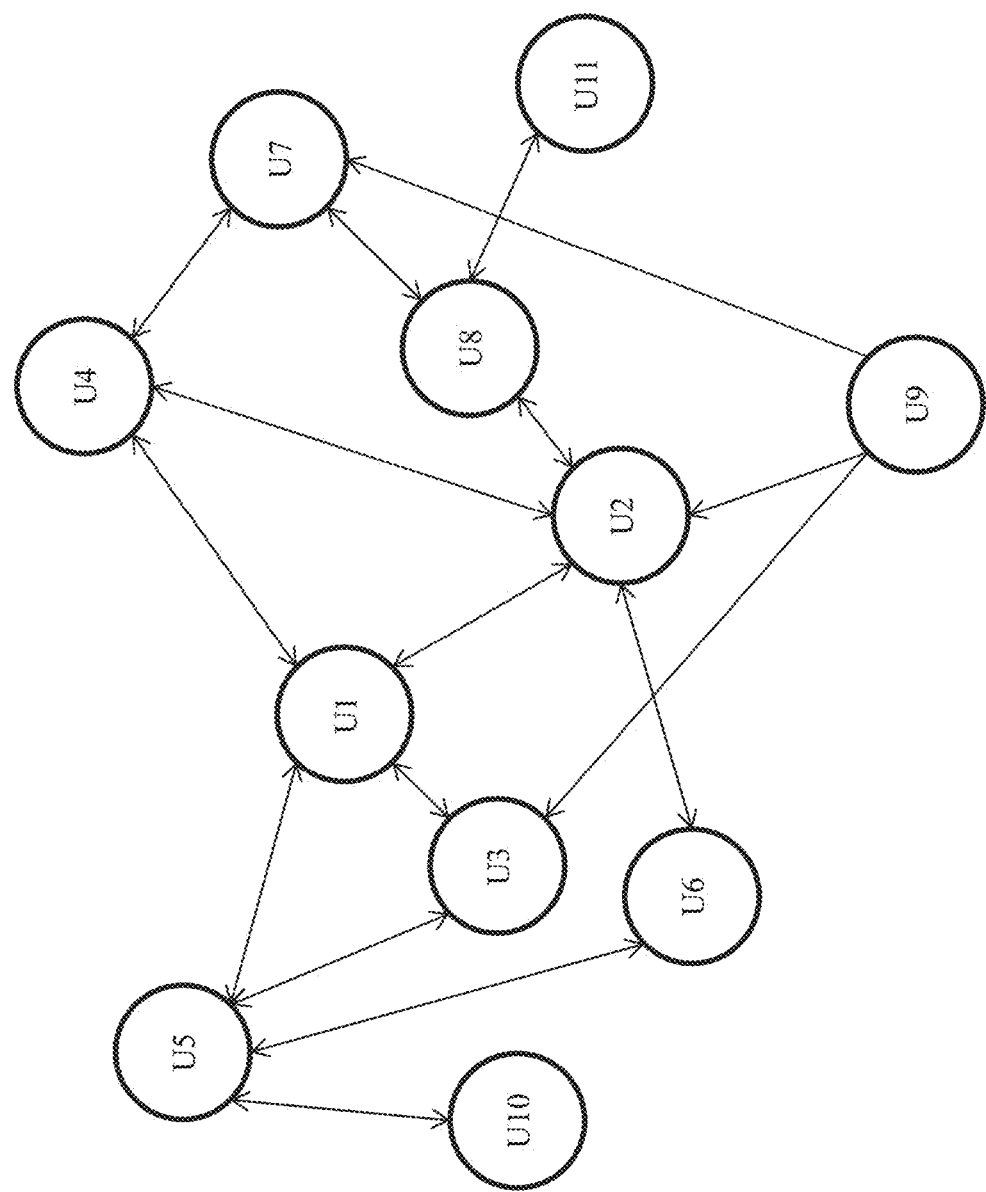
FIG. 9 depicts an exemplary correspondence graph, according to an embodiment of the present teaching.

FIG. 9 depicts an exemplary correspondence graph, according to an embodiment of the present teaching. In this example, each node of the correspondence graph represents a user (U1, U2, . . . , U11) who is connected with at least another user based on their correspondences. For each pair of the users, their connections are represented as links between the corresponding nodes. The arrow of each link represents the direction of communication. For example, all the connections in FIG. 9 are bidirectional except for the connections between U9 and U2, U9 and U3, and U9 and U7.

Figure 10:
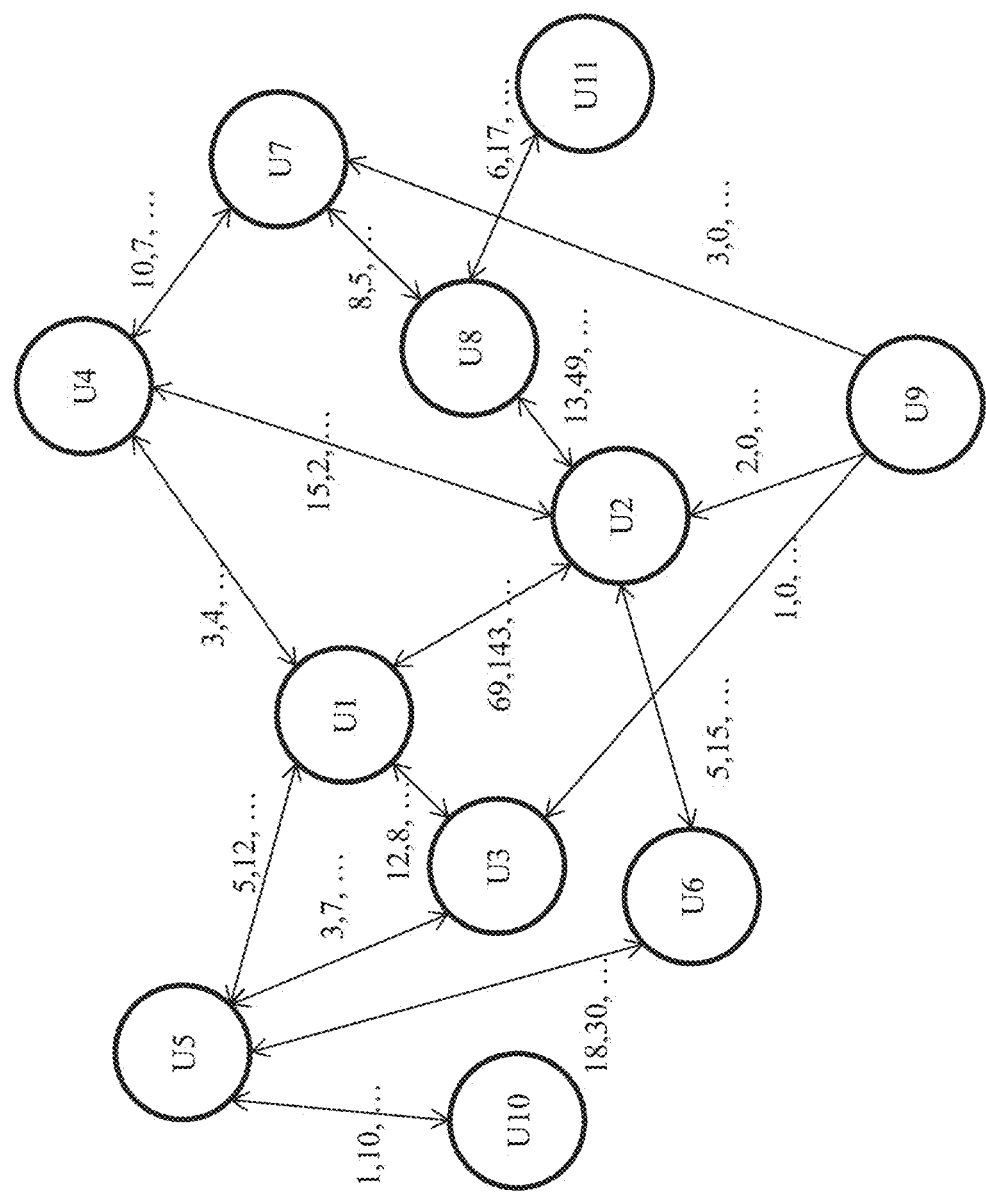
FIG. 10 depicts another exemplary correspondence graph, according to an embodiment of the present teaching.

FIG. 10 depicts another exemplary correspondence graph, according to an embodiment of the present teaching. Compared with the correspondence graph in FIG. 9, each link in the correspondence graph of FIG. 10 is associated with a set of weights over interests, which represents the connection strength over interests between the respective pair of users. The larger a value is, the stronger the connection is between the user pair over a particular interest. As described above, in additional to a set of static values, the weights may be in the form of a model or a vector representing the strength over interests.

Figure 11:
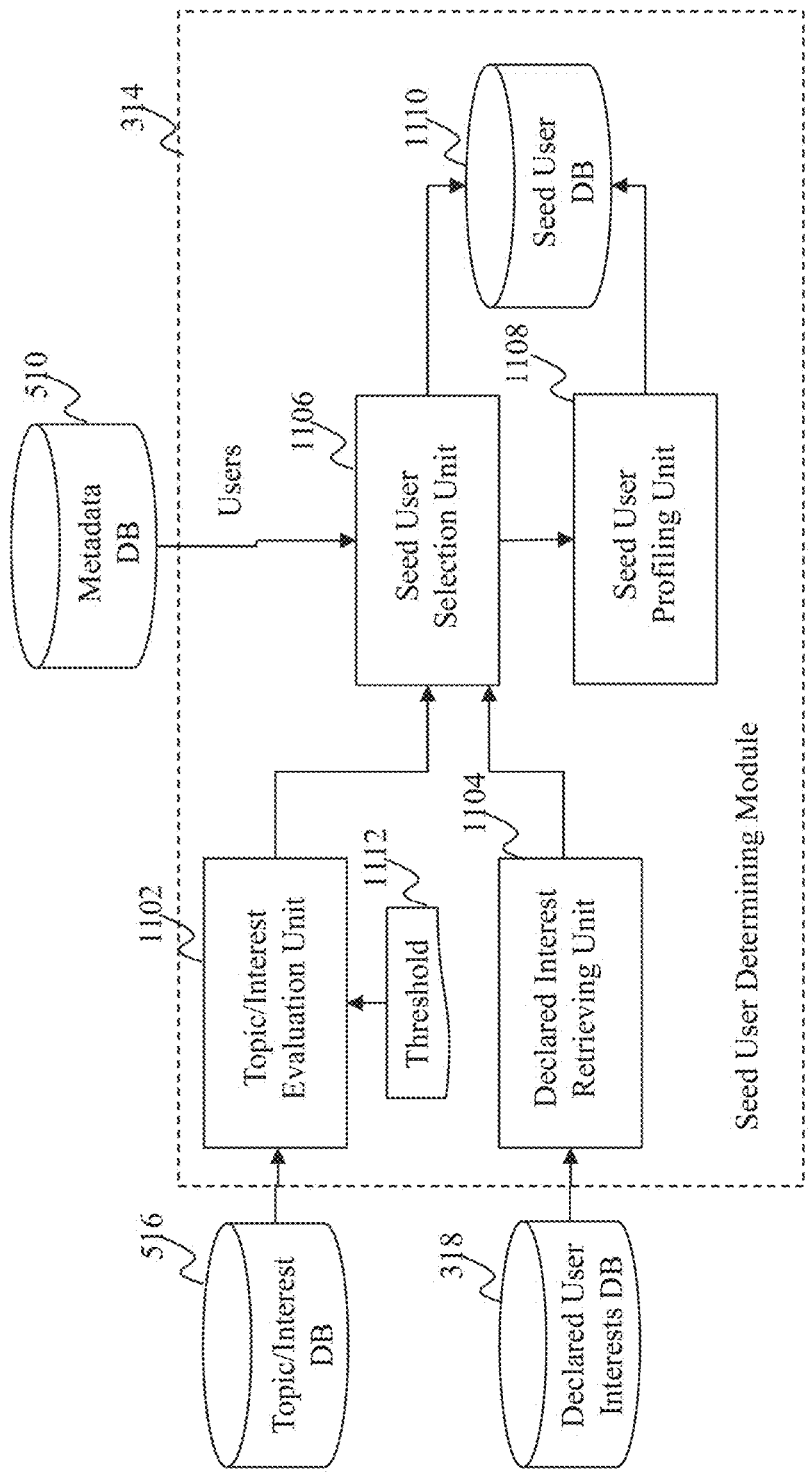
FIG. 11 is an exemplary system diagram of a seed user determining module, according to an embodiment of the present teaching.

FIG. 11 is an exemplary system diagram of the seed user determining module in FIG. 3, according to an embodiment of the present teaching. The seed user determining module 314 in this embodiment includes a topic/interest evaluation unit 1102, a declared interest retrieving unit 1104, a seed user selection unit 1106, a seed user profiling unit 1108, and a seed user database 1110. As described above, based on analyzing the contextual information of the user correspondences, e.g., semantic analysis on the content, implied user interests may be estimated for each pair of user, which is stored in the topic/interest database 516. The topic/interest evaluation unit 1102 may compare the implied user interests against a threshold 1112, e.g., a preset confidence level, to determine certain strong implied interest as accurate, known interests for the pair of users, even though the users do not make explicitly declaration. In some embodiments, in addition to interests derived from user correspondences, implied user interests may be obtained based on other user behaviors, such as user browsing habits, user online actions, etc. Any implied user interests derived from any user-related data may be compared against the threshold 1112 and evaluated by the topic/interest evaluation unit 1102 to determine whether they are qualified as accurate, known user interests. On the other hand, the declared interest retrieving unit 1104 may directly retrieve declared interests from the declared user interest database 318 as another type of accurate, known interests.

Based on the known user interests, e.g., qualified derived interests and/or declared interests, the seed user selection unit 1106 selects seed user(s) from all the users in the correspondence graph (user information may be stored in the metadata database 510). In one example, any user having at least one known user interest is automatically qualified as a seed user. In another example, one or more conditions may be used (e.g., at least n interests are known, or a particular interest is known) to select the qualified seed users. It is understood that in some embodiments, some or all of the seed users may be manually selected based on prior knowledge or experience with respect to the seed users. In any event, user interest profiles (e.g., sets of known user interests) of each selected seed user are provided by the seed user profiling unit 1108 and stored in the seed user database 1110.

Figure 12:
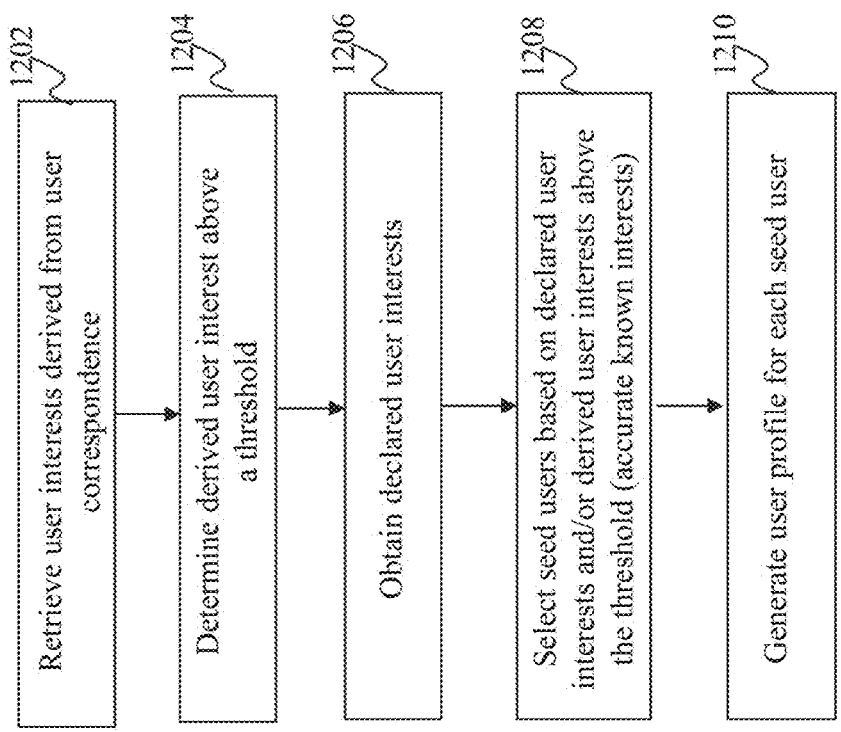
FIG. 12 is a flowchart of an exemplary process for a seed user determining module, according to an embodiment of the present teaching.

FIG. 12 is a flowchart of an exemplary process for a seed user determining module, according to an embodiment of the present teaching. In operation, at 1202, user interests derived from user correspondences are retrieved. At 1204, derived user interests above a threshold are determined as known user interests. At 1206, declared user interests are obtained as well. At 1208, seed users are selected based on the declared user interests and/or derived user interests above the threshold. In other words, any known, accurate user interests may be used to select seed users. At 1210, user profiles (e.g., the sets of known interests) of each seed user are generated.

Figure 13:
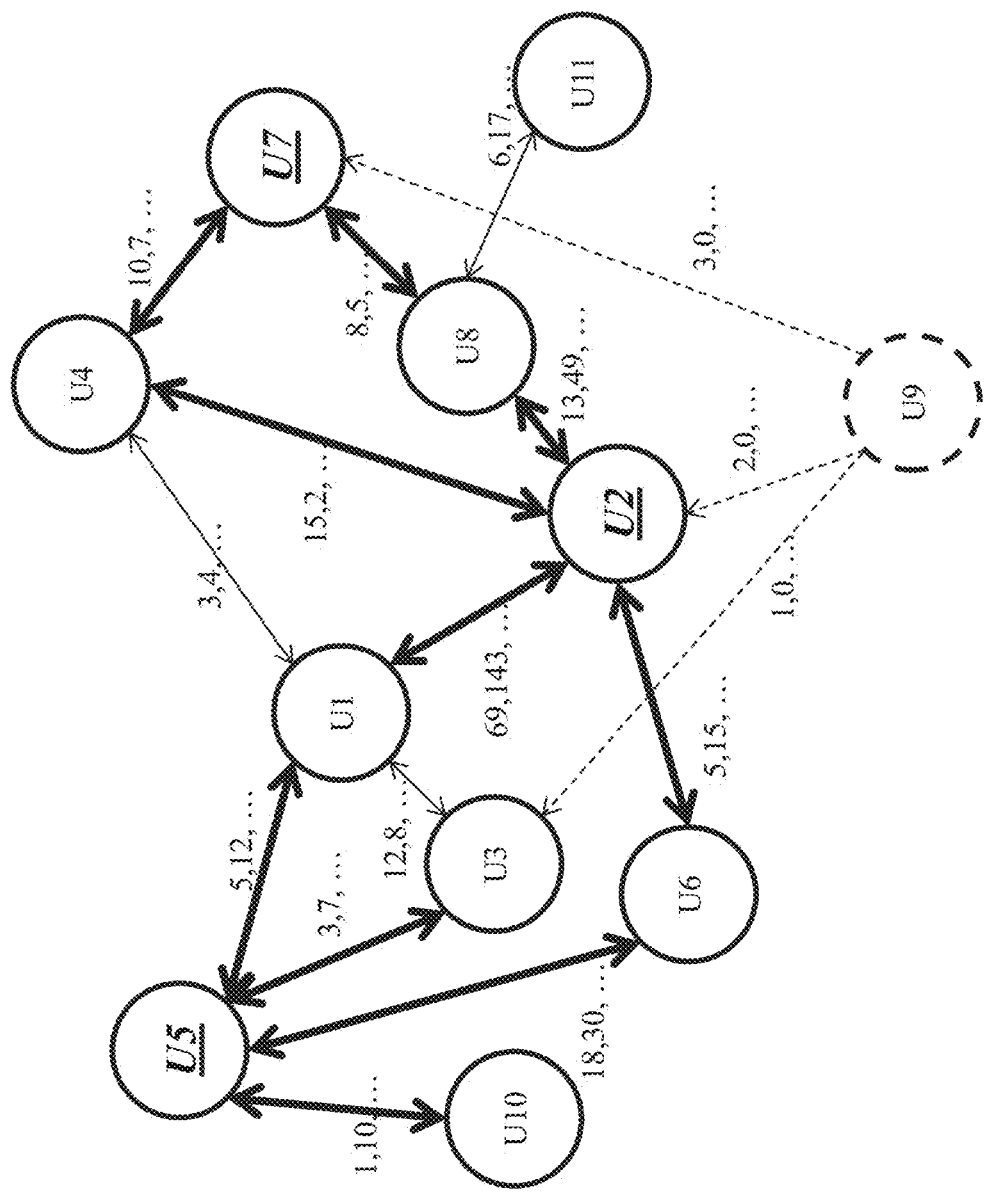
FIG. 13 depicts still another exemplary correspondence graph, according to an embodiment of the present teaching.

FIG. 13 depicts still another exemplary correspondence graph, according to an embodiment of the present teaching. In the correspondence graph, seed users (U2, U5, and U7) are selected from all the users in the correspondence graph because their interests are known. Their known interests then can be propagated to users with whom they frequently communicate (e.g., direct neighbors in the correspondence map) via the links (thick lines). It is noted that one user (U9)'s node is removed from the correspondence graph. As described before, all the connections related to U9 are unidirectional, i.e., no response/replies being received from U2, U3, or U7 after U9 sending the correspondence to them. It is likely that U9 represents a user who keeps sending spams or advertisements to other users, and thus, should be excluded from the correspondence graph.

Figure 14:
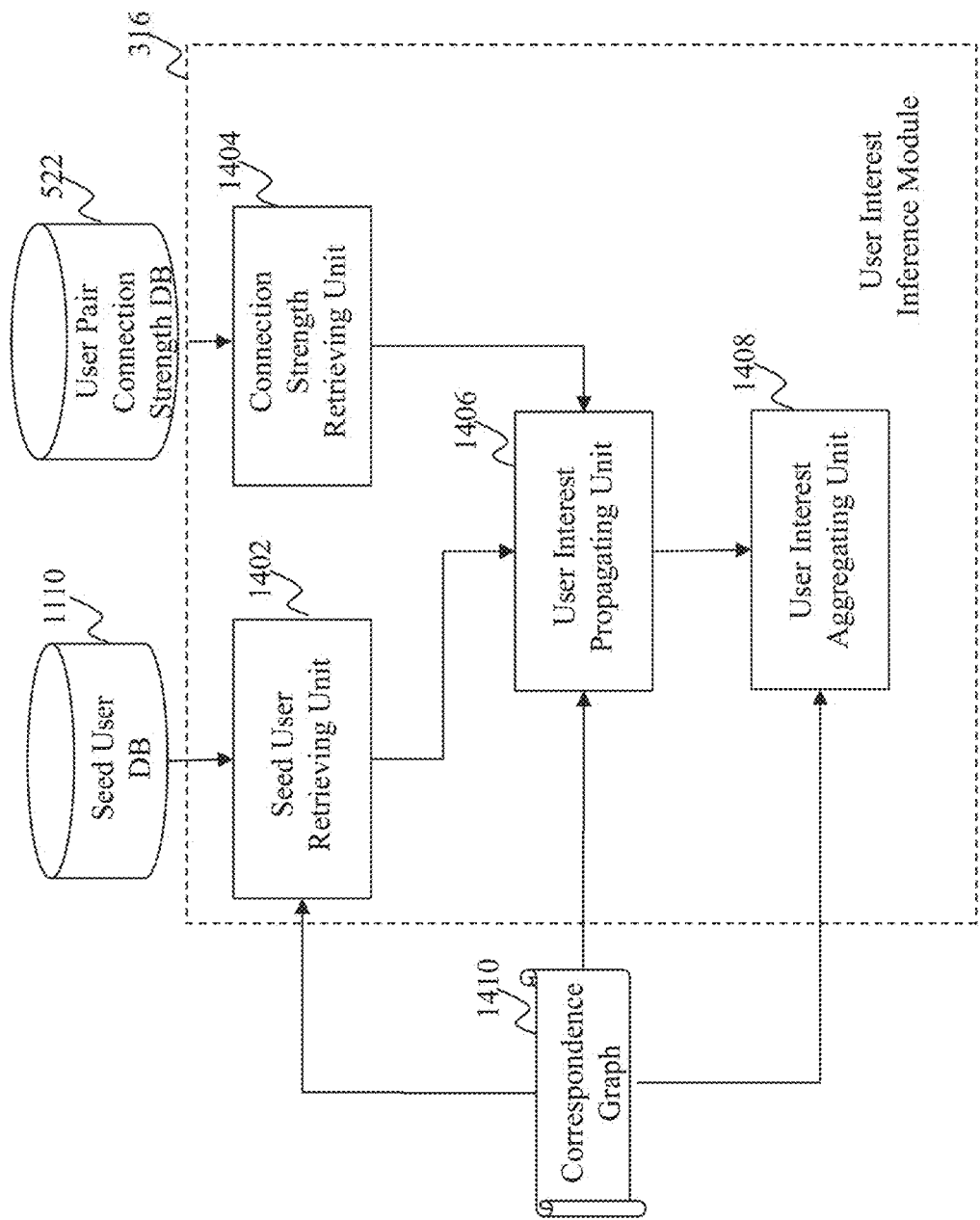
FIG. 14 is an exemplary system diagram of a user interest inference module, according to an embodiment of the present teaching.

FIG. 14 is an exemplary system diagram of the user interest inference module in FIG. 3, according to an embodiment of the present teaching. The user interest inference module 316 in this embodiment includes a seed user retrieving unit 1402, a connection strength retrieving unit 1404, a user interest propagating unit 1406, and a user interest aggregating unit 1408. The seed user retrieving unit 1402 retrieves the seed users and their known interest sets from either the seed user database 1110 or from the correspondence graph 1410 directly. The connection strength retrieving unit 1404 retrieves connection strengths of all links in the correspondence graph 1410 from the user pair connection strength database 522 or from the correspondence graph 1410 directly (not shown). Based on the seed user information and the connection strength information, the user interest propagating unit 1406 propagates the known interests of each seed user to its neighbors in the correspondence graph 1410 taking into consideration of the connection strengths between the seed users and their respective neighbors. The connection strengths, e.g., weights, are used as factors to amplify or attenuate the level of each respective interest as it is propagated to the neighbors.

For example, as shown in FIG. 13, for seed user U5, its known interest sets (e.g., cooking: strong; fishing: fair) are propagated to each of neighbors, i.e., U10, U6, U3, and U1, respectively. The level of each known interest is adjusted based on the weights associated with each link between the seed user U5 and the respective neighbors. In one example, assuming weight value "1" is relative small and will cause attenuation of the "cooking interest," then the level of "cooking interest" propagated from U5 to U10 may be attenuated by the weight value "1," so that U10, as a direct neighbor of the seed user U5, has a relative low level of "cooking interest" compared with U5. It is understood that the example shown in FIG. 13 is for illustration purpose only. As described above, the weights are not limited to static values shown in FIG. 13 and can be a model or vector. In any event, the weights over interests are used for adjusting the level of known interests when they are propagated from the seed users to their neighbors. It is understood that the propagation of known user interests from the seed users may continue until the levels of known user interest from all the seed users reach out to all nodes in the correspondence graph 1410.

In some embodiments, the interests derived from user correspondences may be used to filter the known interests of seed users when the known interests are propagated through the respective links in the correspondence graph 1410. For example, if a seed user is known as being interested in football and the correspondences between the seed user and his/her neighbor node reveal that they never exchange messages about football, then the interest on football may not be propagated from the seed user to this neighbor node. The granularity of the filters may be adjusted as need. In the example above, even the seed user and his/her neighbor node do not exchange messages about football, they may exchange messages about hockey frequently. In some embodiment, more general categories, such as sports, may be used so that the interest on sports may pass through from the seed user to his/her neighbor node.

It is noted that sometimes the known interests of the seed users that are to be propagated through the correspondence graph 1410 and the topics/interests derived from the user correspondences (as part of the connections strengths) may be redundant or conflicting. To reconcile the redundancy and conflict, in one embodiment, the interests derived from the user correspondences are not only used to filter, but also to infer (amplify or attenuate) the known interests of the seed users to be propagated. For example, a model can be learned using any known machine learning approaches to estimate a probability that a known interest can be propagated over each of the derived interests from user correspondences. For example, two friends may talk about NBA over emails, but never had the chance to talk about football, even though one is a football fan. A model may be learned to estimate that there is a high probability that the known interest on football from one friend (as a seed user) can be propagated over a derived interest on NBA, but a very low probability over a derived interest on, for example, stock market. Here specific topics can be used, or a less granular model, e.g. categories (finance, sports, etc.) can be used.

Returning to FIG. 14, the user interest aggregating unit 1408 is configured to adjust the level of known interest at each node. Each node may be connected to more than one node in the correspondence graph 1410. Thus, the user interests at each node may be estimated by summing up the contributions from all of its neighbors. For example, in FIG. 13, the user U8 is connected with two seed nodes: U2 and U7. The levels of known interests from both U2 and U7 (adjusted by the respective connection strength) are both taken into consideration for determining the known interests of U8. In this embodiment, if more than one interest is inferred for a user, then the set of interests are ranked based on their levels, and the interest rank set can be used to characterize the user.

Figure 15:
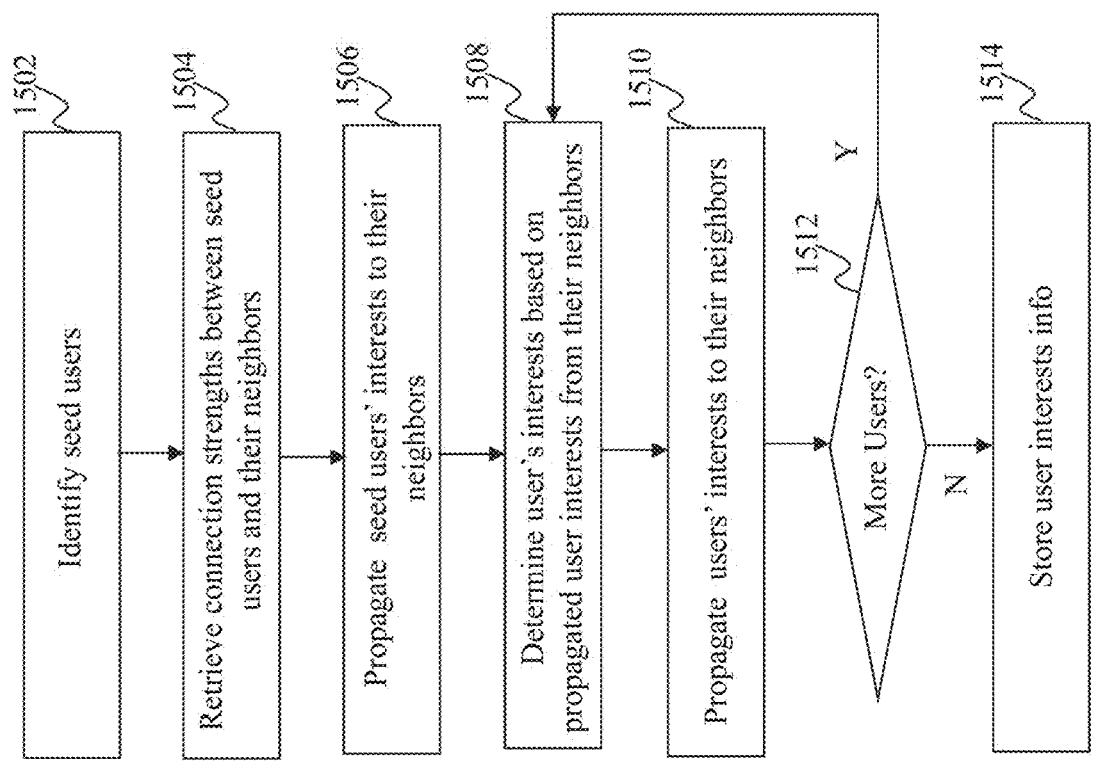
FIG. 15 is a flowchart of an exemplary process for a user interest inference module, according to an embodiment of the present teaching.

FIG. 15 is a flowchart of an exemplary process for a user interest inference module, according to an embodiment of the present teaching. In operation, at 1502, seed users are identified. Each of the seed users has at least one known interest. The seed users may be automatically identified based on declared interests and/or derived interests above a threshold or may be manually appointed. At 1504, connection strengths between seed users and their neighbors in the correspondence graph are retrieved. At 1506, seed users' known interests are propagated to their neighbors. At 1508, user interests for each node (direct neighbors of seed users) are determined based on propagated known user interests from their neighbors (seed users). The propagated known user interests are adjusted by the connection strengths (e.g., weighting factors). At 1510, the user interests at each node (direct neighbors of seed users) are propagated to their direct neighbors and adjusted by the respective connection strength. At 1512, whether there are more users in the correspondence graph whose user interests have not been inferred is determined. If all the users in the correspondence graph have their interests inferred, then their user interests are stored at 1514. Otherwise, the process returns to 1508 and iterates until the result of 1512 becomes negative.

Figure 16:
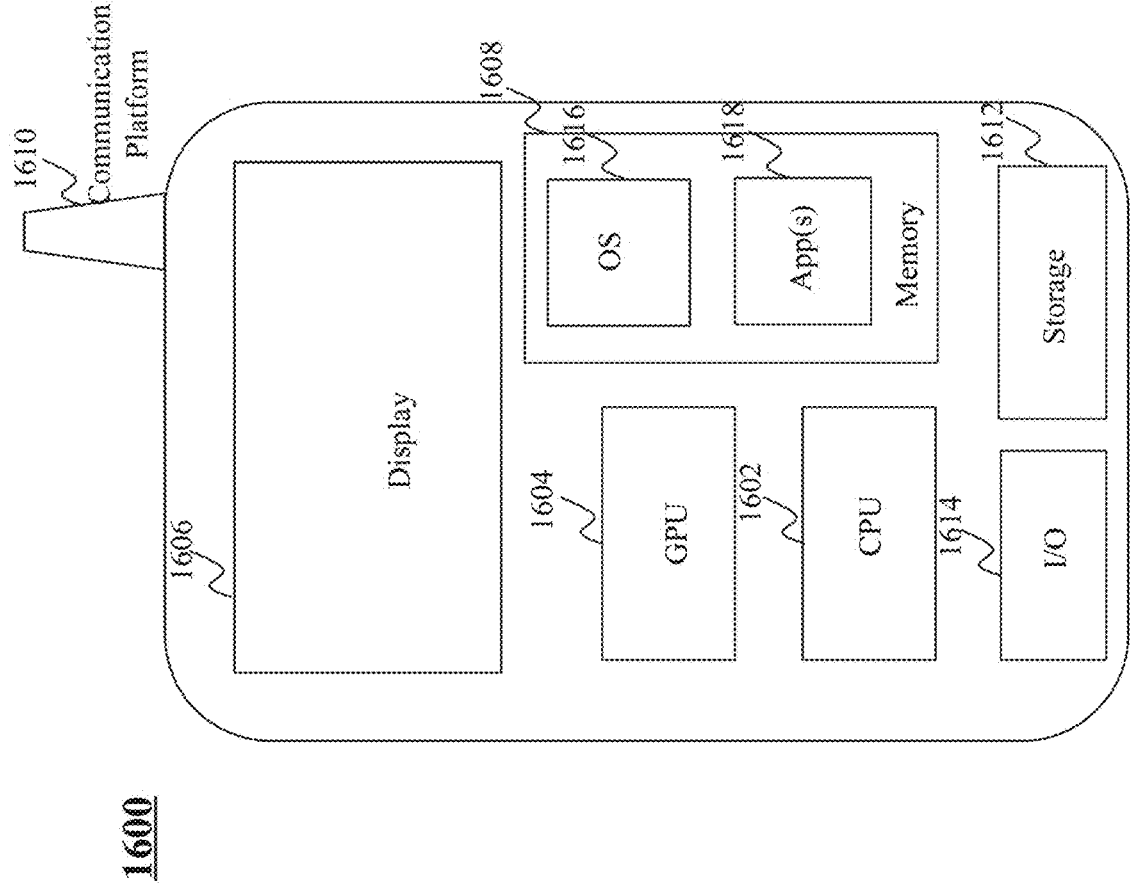
FIG. 16 depicts the architecture of a mobile device which can be used to implement a specialized system incorporating the present teaching.

FIG. 16 depicts the architecture of a mobile device which can be used to realize a specialized system implementing the present teaching. In this example, the user device on which content and query results are presented and interacted-with is a mobile device 1600, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, including but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or any other suitable mobile apps for receiving and rendering correspondences on the mobile device 1600. User interactions with the correspondences may be achieved via the I/O devices 1614 and provided to the user interest inference engine 102 via communication platform 1610.

To implement various modules, units, and their functionalities described in the present disclosure, computer hardware platforms may be used as the hardware platform(s) for one or more of the elements described herein (e.g., the user interest inference engine 102 described with respect to FIGS. 1-15). The hardware elements, operating systems and programming languages of such computers are conventional in nature, and it is presumed that those skilled in the art are adequately familiar therewith to adapt those technologies to user interest inference as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 17:
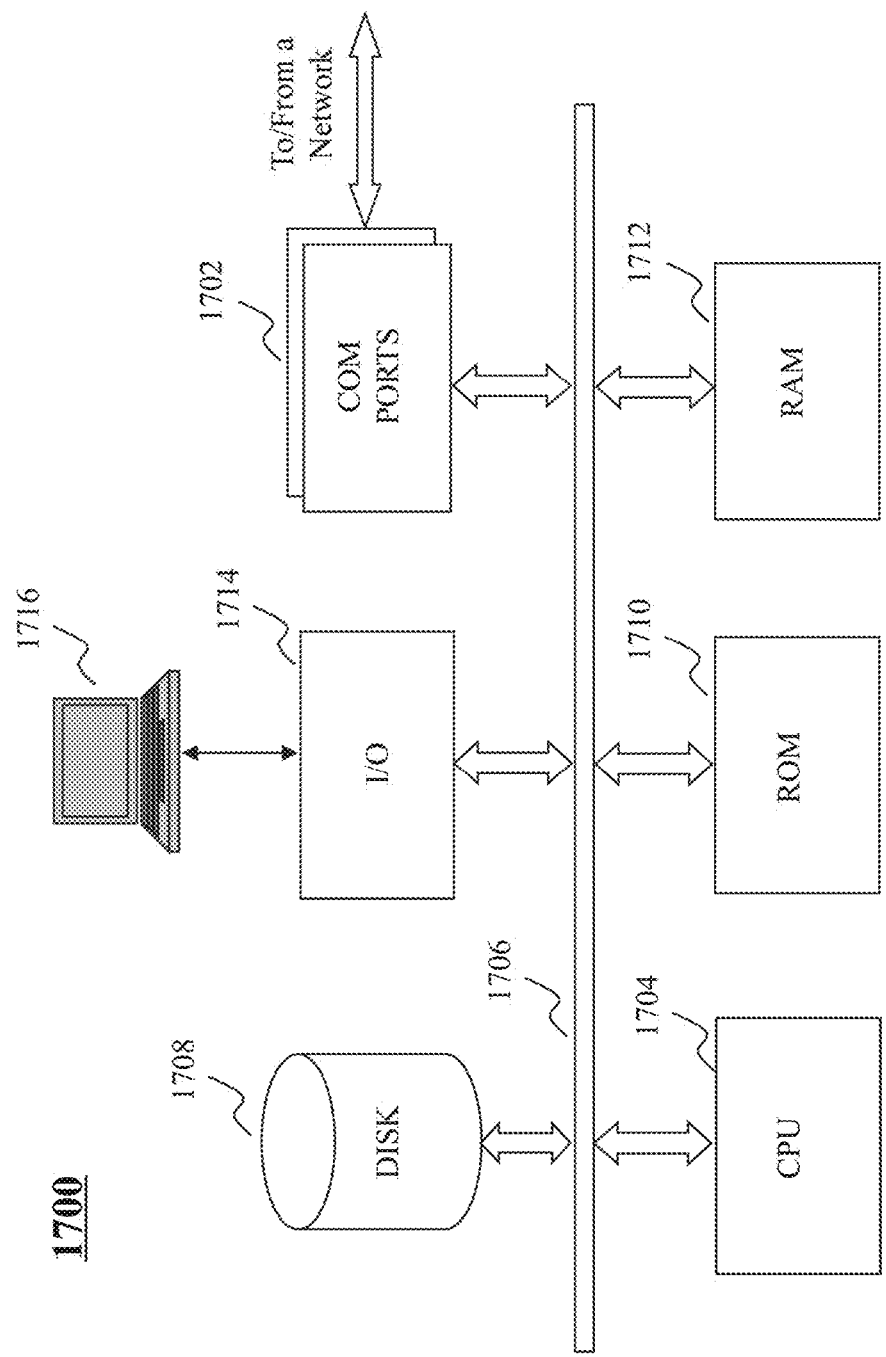
FIG. 17 depicts the architecture of a computer which can be used to implement a specialized system incorporating the present teaching.

FIG. 17 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1700 may be used to implement any component of user interest inference techniques, as described herein. For example, the user interest inference engine 102, etc., may be implemented on a computer such as computer 1700, via its hardware, software program, firmware, or a combination thereof. Although only one such computer is shown, for convenience, the computer functions relating to user interest inference as described herein may be implemented in a distributed fashion on a number of similar platforms, to distribute the processing load.

The computer 1700, for example, includes COM ports 1702 connected to and from a network connected thereto to facilitate data communications. The computer 1700 also includes a central processing unit (CPU) 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the methods of user interest inference and/or other processes, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator into the hardware platform(s) of a computing environment or other system implementing a computing environment or similar functionalities in connection with user interest inference. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a computing device having at least one processor, storage, and a communication platform capable of connecting to a network for determining user interest, comprising:
obtaining correspondences among a plurality of users;
identifying connections between at least some of the plurality of users based on the correspondences;
constructing a graph based on the identified connections, wherein each of the identified connections has a strength determined based on one or more topics determined from content included within one or more of the correspondences associated with that identified connection, wherein the identified connections do not include connections associated with only unidirectional correspondences;
selecting one or more seed users from the plurality of users based on at least one implied interest derived from the content included within at least some of the one or more of the correspondences associated with the one or more seed users, wherein the at least one implied interest comprises at least one of the one or more topics, wherein the at least one implied interest is classified as a known interest in response to a determination that a confidence level of the at least one implied interest exceeds a confidence threshold, and wherein each of the one or more seed users has at least one known interest; and
determining an interest to be propagated to each of the at least some of the plurality of users based on the graph and the at least one known interest of the one or more seed users.

2. The method of claim 1, wherein:
the correspondences comprise at least one of: email, instant message, short message service (SMS) based communication, or multimedia message service (MMS) based communication; and
the interest to be propagated to each of the at least some of the plurality of users comprises the implied interest that is classified as the known interest.

3. The method of claim 1, wherein the strength for each of the identified connections is further determined by:
extracting metadata from the one or more of the correspondences associated with the identified connection;
identifying parameters of the one or more of the correspondences from the extracted metadata; and
determining the strength based on the identified parameters, wherein the identified parameters comprise at least one of frequency, recency, or direction of the identified connection.

4. The method of claim 1, wherein the strength for each of the identified connections is further determined by:
extracting the content included within the one or more of the correspondences associated with the identified connection; and
determining the one or more topics of the content.

5. The method of claim 1, wherein:
the one or more seed users are further selected based on one or more declared user interests of each of the one or more seed users; and
the at least one known interest of each of the one or more seed users comprises (i) the one or more declared interests of each of the one or more seed users and (ii) the at least one implied interest of each of the one or more seed users that is classified as the known interest.

6. The method of claim 1, further comprising:
propagating the at least one known interest of each of the one or more seed users to each neighboring user of each of the one or more seed users on the graph, wherein the at least one known interest comprises the at least one implied interest that is classified as the known interest; and
adjusting levels of the at least one known interest at each neighboring user of each of the one or more seed users based on the strength of the connection between a corresponding neighboring user and a corresponding seed user.

7. The method of claim 1, wherein the correspondences comprise direct communications or indirect communications.

8. The method of claim 1, wherein the strength for each of the identified connections is amplified or attenuated based on a set of weights associated with a corresponding identified connection, and a level of the interest for each neighboring connection of each seed user is adjusted based on the strength between the neighboring connection and the seed user.

9. A system for determining user interest, comprising:
a user correspondence analyzing module configured to obtain correspondences among a plurality of users and identify connections between at least some of the plurality of users based on the correspondences;
a user correspondence graph building module configured to construct a graph based on the identified connections, wherein each of the identified connections has a strength determined based on one or more topics determined from content included within one or more of the correspondences associated with that identified connection, wherein the identified connections do not include connections associated with only unidirectional correspondences;
a seed user determining module configured to select one or more seed users from the plurality of users based on at least one implied interest derived from the content included within at least some of the one or more of the correspondences associated with the one or more seed users, wherein:
the at least one implied interest comprises at least one of the one or more topics,
the at least one implied interest is classified as a known interest in response to a determination that a confidence level of the at least one implied interest exceeds a confidence threshold, and
each of the one or more seed users has at least one known interest; and
a user interest inference module configured to determine an interest to be propagated to each of the at least some of the plurality of users based on the graph and the at least one known interest of the one or more seed users.

10. The system of claim 9, wherein:
the correspondences comprise one or more of email, instant message, short message service (SMS) based communication, or multimedia message service (MMS) based communication; and
the interest to be propagated to each of the at least some of the plurality of users comprises the implied interest that is classified as the known interest.

11. The system of claim 9, wherein the strength for each of the identified connections is further determined by:
a metadata extracting unit configured to extract metadata from the one or more of the correspondences associated with the identified connection;
a parameter determining unit configured to identify parameters of the one or more of the correspondences from the extracted metadata; and
a connection strength determining unit configured to determine the strength based on the identified parameters, wherein the identified parameters comprise at least one of frequency, recency, or direction of the identified connection.

12. The system of claim 9, wherein the user correspondence analyzing module comprises:
a content extracting unit configured to extract the content included within the one or more of the correspondences associated with the identified connection; and
a topic identifying unit configure to determine the one or more topics of the content.

13. The system of claim 9, wherein:
the one or more seed users are further selected based on one or more declared user interests each of the one or more seed users; and
the at least one known interest of each of the one or more seed users comprises (i) the one or more declared interests of each of the one or more seed users and (ii) the at least one implied interest of each of the one or more seed users that is classified as the known interest.

14. The system of claim 9, wherein the user interest inference module comprises:
a user interest propagating unit configured to propagate the at least one known interest of each of the one or more seed users each neighboring user of each of the one or more seed users on the graph, wherein the at least one known interest comprises the at least one implied interest that is classified as the known interest; and
a user interest aggregating unit configured to adjust levels of the at least one known interest at each neighboring user of each of the one or more seed users based on the strength of the connection between a corresponding neighboring user and a corresponding seed user.

15. A machine-readable, non-transitory and tangible medium having data recorded thereon for determining user interest, the medium, when read by the machine, causes the machine to perform the following:
obtaining correspondences among a plurality of users;
identifying connections between at least some of the plurality of users based on the correspondences;
constructing a graph based on the identified connections, wherein each of the identified connections has a strength determined based on one or more topics determined from content included within one or more of the correspondences associated with that identified connection, wherein the identified connections do not include connections associated with only unidirectional correspondences;
selecting one or more seed users from the plurality of users based on at least one implied interest derived from the content included within at least some of the one or more of the correspondences associated with the one or more seed users, wherein the at least one implied interest comprises at least one of the one or more topics, wherein the at least one implied interest is classified as a known interest in response to a determination that a confidence level of the at least one implied interest exceeds a confidence threshold, and wherein each of the one or more seed users has at least one known interest; and
determining an interest to be propagated to each of the at least some of the plurality of users based on the graph and the at least one known interest of the one or more seed users.

16. The medium of claim 15, wherein the strength for each of the identified connections is further determined by:
extracting metadata from the one or more of the correspondences associated with the identified connection;
identifying parameters of the one or more of the correspondences from the extracted metadata; and determining the strength based on the identified parameters, wherein the identified parameters comprise at least one of frequency, recency, or direction of the identified connection.

17. The medium of claim 15, wherein the medium, when read by the machine further causes the machine to perform the following:

propagating the at least one known interest of each of the one or more seed users to-each neighboring user of each of the one or more seed users on the graph, wherein the at least one known interest comprises the at least one implied interest that is classified as the known interest; and adjusting levels of the at least one known interest at each neighboring user of each of the one or more seed users based on the strength of the connection between a corresponding neighboring user and a corresponding seed user.

* * * * *